(No Model.)

A. P. DE VOURSNEY.
FORM OR MOLD FOR BENDING GLASS.

No. 280,143. Patented June 26, 1883.

WITNESSES:
E. B. Bolton
Geo. Baunton

INVENTOR:
Abraham P. De Voursney
By his Attorneys.
Burke, Fraser & Connett

N. PETERS. Photo-Lithographer, Washington, D. C.

UNITED STATES PATENT OFFICE.

ABRAHAM P. DE VOURSNEY, OF MONTCLAIR, NEW JERSEY.

FORM OR MOLD FOR BENDING GLASS.

SPECIFICATION forming part of Letters Patent No. 280,143, dated June 26, 1883.

Application filed April 20, 1883. (No model.)

*To all whom it may concern:*

Be it known that I, ABRAHAM P. DE VOURSNEY, a citizen of the United States, residing at Montclair, Essex county, New Jersey, have invented certain Improvements in Forms or Molds for Bending Glass, of which the following is a specification.

My invention relates to forms or molds for bending sheets of glass into party-tubular shapes, for use in lamps, carriage and other windows, and for the various purposes to which this kind of glass is adapted.

Ordinarily in the process of bending glass plates a semi-tubular metal plate is formed, usually by bending, and this is placed in a muffle, with the flat sheet of glass placed on or in its upper concave side. When the glass is softened by the heat, it sinks by gravity and assumes the curve of the metal form or mold. The objection to this method is that the glass, when it touches the metal of the mold, becomes "spotted" or pitted, and this, for many purposes, destroys its usefulness. To avoid it the attempt is often made to check the operation just before the glass descends, at its middle part, low enough to touch the mold or form, and a skillful operator will succeed quite well in this; but the difficulty lies in producing plates of uniform curvature in this way. The defects of these methods are especially observable in the bending of small sheets of thick plate-glass for carriage-lamps, wherein the curvature must be very accurate and uniform, in order that they shall fit the frames, and wherein the least distortion or marring of the transparency is very objectionable. My form or mold is especially adapted for this class of work.

The distinguishing feature of my invention is the recessing or cutting away of the mold or form in such a way that the sheet of glass shall rest on the metal of the same only at its margins all around. This effects the proper curvature of the glass, and yet prevents its central parts from coming in contact with the metal, whereby I preserve the rounded cylindrical face in all its purity of finish and polish. The edges where the glass touches the metal are always cut away in fitting the glass to its frame, and if they are marred it is immaterial. Such glasses are usually beveled all around after bending, and this removes all traces of the contact with the metal, should any be left after trimming.

Figure 1:
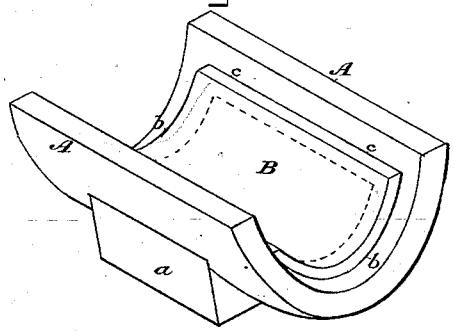
Figure 2:
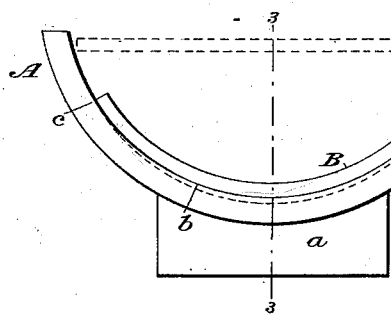
Figure 4:
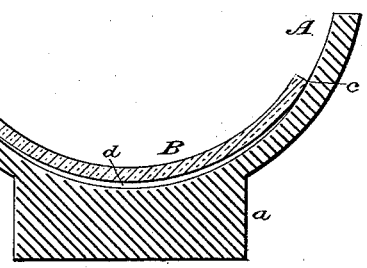
Figure 3:
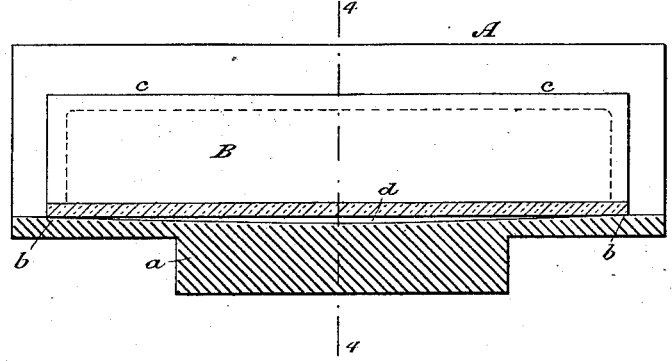
Figure 5:
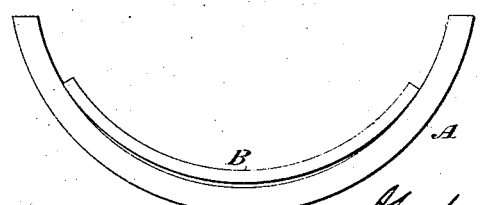

In the drawings which serve to illustrate my invention, Figure 1 is a perspective view of my improved form or mold with a sheet of glass lying therein. Fig. 2 is an end elevation of the same, the flat sheet, before bending, being indicated by dotted lines. Fig. 3 is a vertical longitudinal mid-section taken in the plane of line 3 3 in Fig. 2. Fig. 4 is a cross-section taken on line 4 4 in Fig. 3. Fig. 5 is an end elevation, designed to illustrate the ordinary means and method of bending.

A is the mold or form, which I usually cast from iron or brass, and *a* is its foot or base. At its ends *b b*, where the ends of the glass B rest, this mold is given the proper curvature that it is desired the glass shall have, and the sides *c c*, near their upper edges, where the sides or lateral edges of the glass rest, have also this curvature throughout the entire length of the mold; but the central part of the concavity of the mold is cut away or recessed, as indicated in Figs. 3 and 4, the recess being lettered *d*. In Fig. 2 this recess is indicated by dotted lines, as it also is on the sides in Figs. 1 and 3.

When the glass is to be bent in my improved mold or form, it is placed in the mold and the latter in the muffle. The heat causes the glass to sink until it touches the mold fairly at the ends and sides, as in Fig. 2, and the workman pushes the mold back out from the influence of the intense heat, where it may gradually cool. It will then be found that the glass has the true curvature of the mold, and is not in the least marred by contact with the mold, except it may be at the margins, which is of no consequence. It is necessary to exercise the ordinary skill and judgment to prevent overheating. Where this occurs, the glass will sag at the center into the recess *d* of the mold, and give that portion of the glass a slightly-convex face. This, however, is not particularly objectionable, provided it is not excessive, and provided that it does not touch the mold. The curvature at the ends will be correct, and that will enable them to fit the frame. In the ordinary mold it is very difficult to avoid one of two alternatives—either the glass will be spotted by touching the mold, or it will be arched or concave longitudinally, both of which are very objectionable features.

In Fig. 5 I have shown the ordinary mold or form, in which the glass has been permitted to sink only part way down to the mold at the middle. By this method the curve is apt to vary in different glasses, for the reasons given, and the ends generally sink lower than the middle, making the glass "saddle-backed," so called.

I might remove the central portion of the mold entirely; but the air confined in the recess $d$ tends somewhat to support the center of the glass and prevent it from sagging. Therefore the form shown will, I believe, produce the best results.

In forming the recess $d$, I make it, by preference, deepest at the center of the mold, the depth decreasing from this point in every direction, as indicated best by the two sections, Figs. 3 and 4. This construction avoids abrupt angles, and, as I believe, produces the best results. The mold, after being cast, is ground and smoothed with an emery-wheel having the same curvature the glass is designed to have when bent.

By employing a sheet of glass with a liberal margin all around I am enabled to remove those parts which touch the mold, and to so square the glass as to remove any warp that may result from the bending.

Having thus described my invention, I claim—

1. A form or mold for bending sheets of glass into party-tubular shapes, having that portion of its face under the central portion of the glass cut away, substantially as described, whereby the glass, when softened by the heat, may rest on the mold only at its margins, for the purposes specified.

2. The metal mold or form A, curved at its ends and sides to the proper degree to impart the desired curvature of the glass, and recessed at $d$, substantially as and for the purposes set forth.

In witness whereof I have hereunto signed my name in the presence of two subscribing witnesses.

ABRAHAM P. DE VOURSNEY.

Witnesses:
HENRY CONNETT,
ARTHUR C. FRASER.